United States Patent
Jin et al.

(10) Patent No.: US 7,697,654 B1
(45) Date of Patent: Apr. 13, 2010

(54) DETERMINING EFFECTIVE CARRIER-TO-INTERFERENCE PLUS NOISE RATIO IN OFDMA SYSTEMS

(75) Inventors: Hang Jin, Plano, TX (US); John Grabner, Plano, TX (US); Li Guo, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/473,801

(22) Filed: May 28, 2009

(51) Int. Cl.
*H04L 23/00* (2006.01)
*H04L 27/36* (2006.01)
(52) U.S. Cl. .................... 375/377; 375/298
(58) Field of Classification Search ............. 375/377, 375/261, 298, 340, 316, 260; 370/208, 343, 370/344, 319; 329/304; 332/103
See application file for complete search history.

(56) References Cited

U.S. PATENT DOCUMENTS

| 7,386,277 | B2 * | 6/2008 | Cho et al. ............. 455/69 |
| 7,580,487 | B2 * | 8/2009 | Chang et al. ............. 375/346 |
| 2009/0022254 | A1 * | 1/2009 | Na et al. ............. 375/346 |
| 2009/0088172 | A1 * | 4/2009 | Lusky et al. ............. 455/446 |

FOREIGN PATENT DOCUMENTS

WO    WO 2009/083960 A2 *   7/2009

\* cited by examiner

*Primary Examiner*—Tesfaldet Bocure
(74) *Attorney, Agent, or Firm*—Edell, Shapiro & Finnan, LLC

(57) ABSTRACT

Techniques are provided to determine a more realistic measure of a physical carrier-to-interference plus noise radio (pCINR) associated with a wireless channel between first and second wireless communication devices. Channel conditions are used to derive a channel margin quantity that is in turn used "discount" the pCINR. The discounted pCINR is then used to determine a modulation and encoding scheme that can be used on the wireless channel for communications between the first and second wireless communication devices.

20 Claims, 6 Drawing Sheets

*Fig. 5*

Assume average pCINR = 17 dB     Selected MCS 3 supported MCSs  [QAM4 ½, (QAM16 ½), QAM64 ½]

(ideal) pCINR     [ 6 dB  ,   12 dB  ,   18 dB  ]

Channel Margin (A) [ 2 dB  ,    4 dB  ,    7 dB  ]

Avg pCINR – A    [ 15 dB ,  ( 13 dB ) ,  10 dB  ]
("discounted pCINR")

eCINR

*Fig. 7*

| MCS | pCINR0 used | Percentile Threshold |
|---|---|---|
| Q4, ½ CTC | 5.8 | 35% |
| Q4 ¾ CTC | 8.4 | 20% |
| Q16 ½ CTC | 10.8 | 30% |
| Q16 ¾ CTC | 14.3 | 20% |
| Q64 ½ CTC | 15.6 | 30% |
| Q64 2/3 CTC | 18 | 20% |
| Q64 ¾ CTC | 19.4 | 10% |
| Q64 5/6 CTC | 21.2 | 10% |

DETERMINING EFFECTIVE CARRIER-TO-INTERFERENCE PLUS NOISE RATIO IN OFDMA SYSTEMS

TECHNICAL FIELD

The present disclosure relates to wireless communication devices and systems, and more particularly to determining effective carrier-to-interference plus noise ratio (CINR) in an orthogonal frequency division multiple access (OFDMA) wireless communications system.

BACKGROUND

Carrier-to-interference plus noise ratio is a measure of the signal quality between two wireless communication devices, e.g., between a base station and a mobile (typically remote) station. There are two types of CINR: Physical CINR (pCINR) and Effective CINR (eCINR).

pCINR is the inherent measure of the signal quality. eCINR is an indication of the actual performance of the signal under real channel conditions, i.e., what order of modulation and encoding scheme can the channel support under real channel conditions. eCINR, and thus the MCS, depend both on the pCINR and the actual conditions of the wireless channel between the two devices.

eCINR is the ultimate measure of signal quality under prevailing channel conditions, and it dictates the actual modulation and encoding scheme when transmitting to a destination device under fading channel conditions. In accordance with the IEEE 802.16 wireless communication standard (known commercially as WiMAX™), a mobile station needs to compute the downlink signal eCINR and report it back to the base station. The base station then assigns a modulation and encoding scheme for downlink traffic to the mobile station accordingly. For uplink transmissions, the base station needs to compute the uplink traffic eCINR, and it assigns a modulation and encoding scheme to be used by the mobile station for uplink traffic accordingly. eCINR is thus a significant parameter used in link adaptation. As such, there is a need to properly obtain an appropriate value for eCINR.

BRIEF DESCRIPTION OF THE DRAWINGS

FIG. 5 shows an example of an eCINR calculation and modulation and encoding scheme selection according to the techniques described herein.

FIG. 7 is an example of a look up table containing data that may be used to obtain a channel margin value for selected modulation and encoding schemes.

DESCRIPTION OF EXAMPLE EMBODIMENTS

Overview

Broadly, techniques are provided herein to determine a more realistic measure of a physical carrier-to-interference plus noise radio (pCINR) associated with a wireless channel between first and second wireless communication devices. Channel conditions are used to derive a channel margin quantity that is in turn used to "discount" the pCINR. The discounted pCINR is then used to determine a modulation and encoding scheme that can be used on the wireless channel for communications between the first and second wireless communication devices.

Example Embodiments

The WiMAX wireless communication standard is a telecommunications technology that provides wireless transmission of data using a variety of transmission modes, from point-to-multipoint links to portable and fully mobile internet access. The technology provides up to 3 Mbit/s broadband speed without the need for cables. The technology is based on the IEEE 802.16 standard (also called Broadband Wireless Access).

Figure 1:
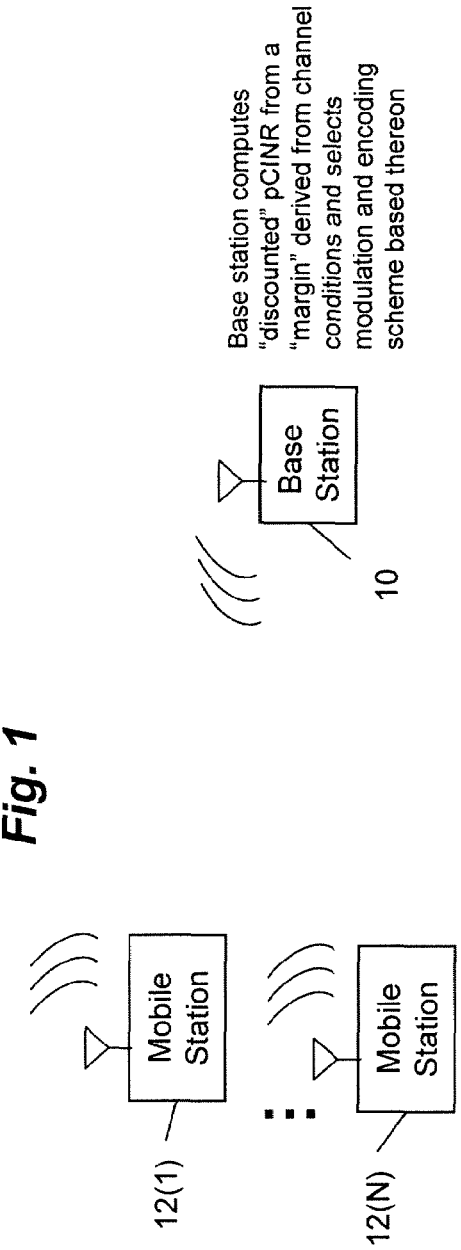
FIG. 1 is a block diagram of a wireless communications network in which the effective carrier-to-interference plus noise ratio (eCINR) computation techniques described herein are employed between a mobile station and a base station.

FIG. 1 shows a block diagram of a wireless communications network in which a base station 10 provides wireless communication services with multiple mobile stations 12(1)-12(N). The base station 10 and the mobile stations 12(1)-12(N) may be configured to wirelessly communicate using the WiMAX communication technology or any other wireless communication standard. According to the techniques described herein, the base station 10 is configured to compute a "discounted" pCINR from a "margin" derived from channel conditions for wireless channel with respect to a given mobile station and to select modulation and encoding scheme based on the discounted pCINR for purposes of wireless communication with that mobile station. However, more broadly, it is to be understood that the techniques described herein may be used by a given wireless communication device, e.g., a first wireless communication device, in connection with wireless communications with another wireless communication device, e.g., a second wireless communication device.

Figure 2:
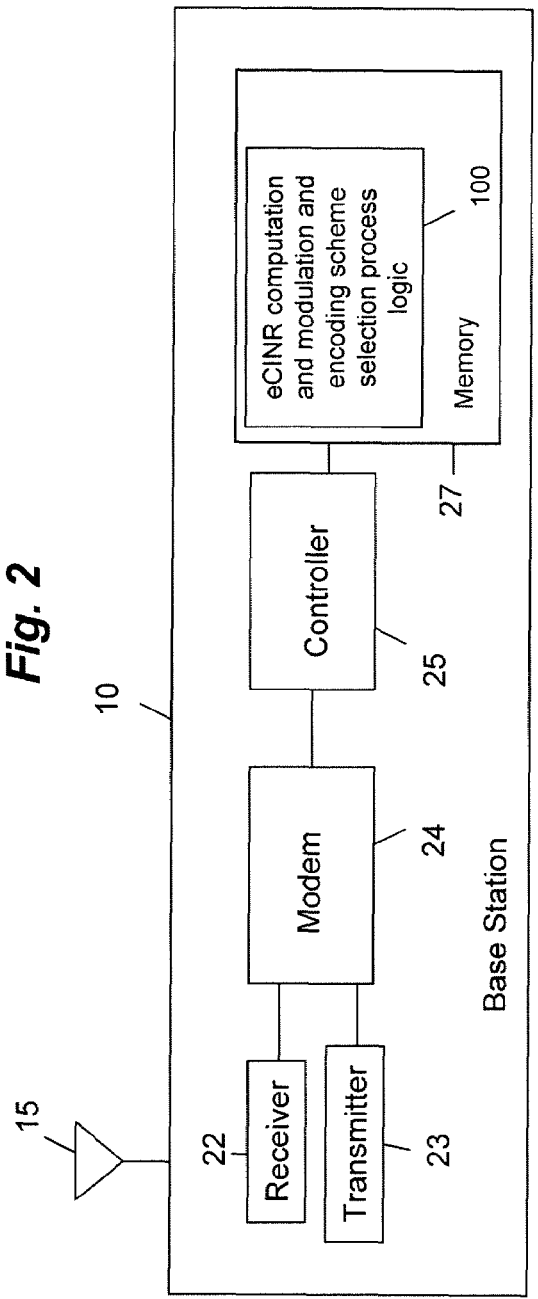
FIG. 2 is an example of a block diagram of a base station that is configured to perform the eCINR computation techniques described herein.

With reference now to FIG. 2, an example of a block diagram is shown of a wireless communication device, e.g., base station 10, that is configured to perform the pCINR computation techniques. The base station 10 comprises, for example, at least one antenna 15 (though in many applications it may comprise multiple antennas), a radio frequency (RF) receiver 22, an RF transmitter 23, a modem 24, a controller 25 and a memory 27. The receiver 22 downconverts received RF energy detected by the antenna 15 and produces a baseband receive signal. There are analog-to-digital converters (ADCs) between (or as part of either or both of) the receiver 22 and the modem 24 to convert the baseband receive signal to a digital signal for processing by the modem 24. Similarly, there are digital-to-analog converters (DACs) between (or as part of either or both of) the modem 24 and the transmitter 23 that convert a baseband transmit signal to an analog transmit signal for upconversion by the transmitter 23 and transmission via antenna 15.

Memory 27 provides storage for the controller 25, e.g., process logic. In particular, software code instructions are stored in memory 27 (or other tangible media) for eCINR computation and modulation and encoding scheme selection process logic 100. The functionality described below may be carried out by controller 25 upon execution of the process logic 100. Thus, the controller 25 is, for example, a data processor, e.g., a microprocessor or microcontroller, that executes the process logic 100 and performs higher level control functions for the base station 10. In another form, the controller 25 is implemented by digital logic gates, a programmable gate array device or other programmable or fixed logic device, and which logic is configured to perform the process logic 100. The modem 24 may be implemented by a data processor, microprocessor, microcontroller, digital signal processor, application specific integrated circuit made up of digital logic gates, a programmable gate array device or other programmable or fixed logic device.

The functions of the process logic 100 may be performed completely by the controller 25 or partly by the modem 24 and partly by the controller 25, or entirely by the modem 24. The modem 24 is configured to apply the appropriate modulation and packet format to a transmission and likewise to recover and demodulate a received transmission according to the rules of the communication protocol employed, e.g., the WiMAX communication standard.

The following description of the process logic 100 is made from the perspective of a base station. However, those skilled in the art will appreciate that a mobile station may be configured in a similar manner to perform similar functionality.

The WiMAX communication standard defines the use an orthogonal frequency division multiple access (OFDMA) modulation techniques. In OFDMA systems, the frequency spectrum is divided into many narrow band frequency segments (tones or subcarriers), and different tones or subcarriers carry different symbols. A signal associated with a particular mobile station user may occupy a designed subset or portion of, or all, the tones. As noted above, CINR is a metric employed to characterize the "channel" between the base station 10 and a given one of the plurality of mobile stations 12(1)-12(N). pCINR is the inherent measure of the signal quality, whereas effective CINR (eCINR) is an indication of the effective or actual performance of the signal under real channel conditions, i.e., what order of modulation and coding scheme (MCS) the channel can support under real channel conditions.

eCINR is the ultimate measure of the signal quality under prevailing channel conditions, and the metric dictates the actual MCS that can be achieved by a receiver (destination device) under fading channel conditions with respect to transmissions from a transmitter (source device). In accordance with the WiMAX protocol, a given mobile station computes the downlink signal eCINR based on downlink transmissions it received from the base station 10 and reports the eCINR back to the base station 10. The base station 10 then assigns a MCS for downlink traffic that it transmits to that mobile station. Conversely, based on uplink transmission received from a given mobile station, the base station 10 computes an uplink eCINR, and assigns a MCS to be used by that mobile station for the uplink traffic transmissions it makes to the base station. Those skilled in the art thus appreciate that eCINR is an important parameter in link adaptation.

Determining eCINR, however, is not specifically defined under the applicable WiMAX standard, namely IEEE 802.16e. The following describes techniques to determine a useful measure of eCINR and employing that measure to select an appropriate MCS (for each of the uplink and downlink) in light of the prevailing channel conditions.

Figure 3:
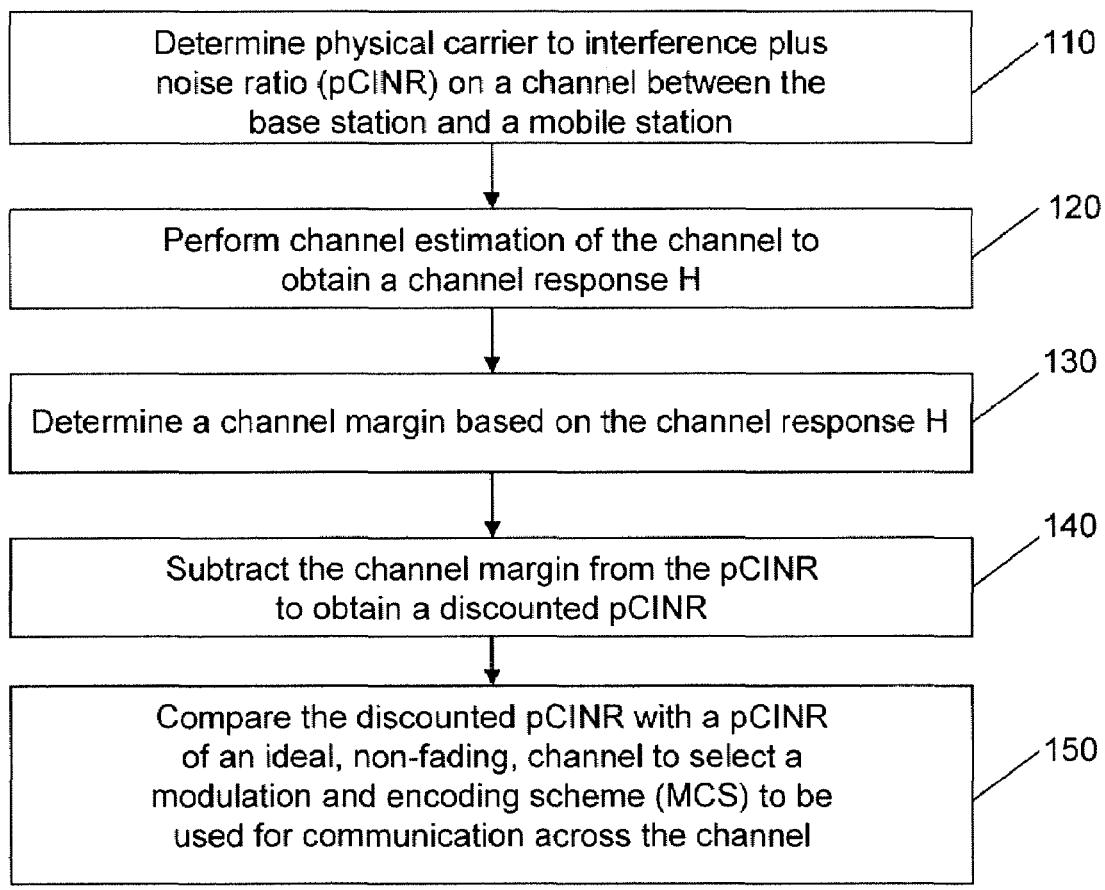
FIGS. 3 and 4 show flowcharts depicting process logic associated with the eCINR computation techniques.

With reference now to FIG. 3, the process logic 100 is now described in more detail. In the case of OFDMA, each mobile station user is defined a given cluster comprising a plurality of subcarriers or tones. At 110, the pCINR on a channel between the a first wireless communication device, e.g., base station 10, and a second wireless communication device, e.g., one of the mobile stations 12(1)-12(N) is determined. In the case where the process logic 100 is executed by the base station 10, the function may be performed either by the base station measuring the pCINR based on uplink transmissions the base station 10 receives from a given mobile station, or by receiving a report transmitted from the given mobile station that indicates the pCINR computed/measured by the mobile station based on downlink transmissions the mobile station receives from the base station 10. In either case, when the pCINR is computed, the pCINR of each tone or subcarrier is computed. pCINR is well-defined in IEEE802.16e as:

$$pCINR=C/(I+N),$$

where C is the desired signal power, I and N are the interferences and noise present at the same tone as the desired signal. The pCINR values over all active tones assigned to a given mobile station may be averaged to obtain a final or average pCINR.

Then, at 120, channel conditions between the two devices are determined using any of a variety of channel estimation techniques (e.g., training signals, pilot subcarriers, etc.). The channel conditions or estimated channel response may be denoted H. For simplicity, the channel response H may be assumed to be a function of frequency only (no Doppler variations).

At 130, a channel margin is determined or computed from the channel response H and in some cases from additional information, described herein as percentile thresholds. The channel margin is denoted A, and as described in more detail hereinafter, is not a single value, but rather a set of values. A channel margin value is computed for each one of a plurality of modulation and encoding schemes that are available for use on the wireless channel between the two devices. For example, WiMAX supports up to eight types of modulation and coding schemes (MCSs), e.g., QAM4½, →QAM64⅚, where the fraction denotes coding rate. In that case, the channel margin A is a set or array of eight values.

At step 140, the channel margin A is subtracted from the pCINR to obtain a discounted pCINR. More specifically, a respective channel margin value is subtracted from the pCINR to obtain a set of values comprising a corresponding plurality of discounted pCINR values, each discounted pCINR value associated with a corresponding modulation and encoding scheme.

Then, at 150, the discounted pCINR is compared with a corresponding ideal pCINR for an ideal non-fading wireless channel for a corresponding modulation and encoding scheme and to select a modulation and encoding scheme to be used for communication for the wireless channel between the two devices. The ideal pCINR is the pCINR that is expected for an ideal non-fading wireless channel exhibiting additive white Gaussian noise (AWGN) channel for each of a the plurality of available MCSs. The comparison at function 150 is used to select the "highest" MCS, that is the MCS with the highest data rate throughput, for which the discounted pCINR is greater than or equal to the corresponding ideal non-fading pCINR. The discounted pCINR corresponding to the selected MCS is designated the eCINR. The selected MCS obtained at 150 may be used directly by the device performing the process logic 100 when transmitting signals to another device (e.g., for downlink transmission from the base station 10 to a given one of a plurality of mobile stations 12(1)-12(N)) or the device performing the process logic 100 may communicate to the other device an indication of the MCS that other device should use when sending transmissions (traffic) to it. Moreover, as explained above, a mobile station may be configured to perform the process logic 100.

In accordance with the foregoing, it is possible to obtain a practical value or measure of the eCINR, and consequently to more accurately select an optimum MCS in light of the prevailing channel conditions.

Figure 4:
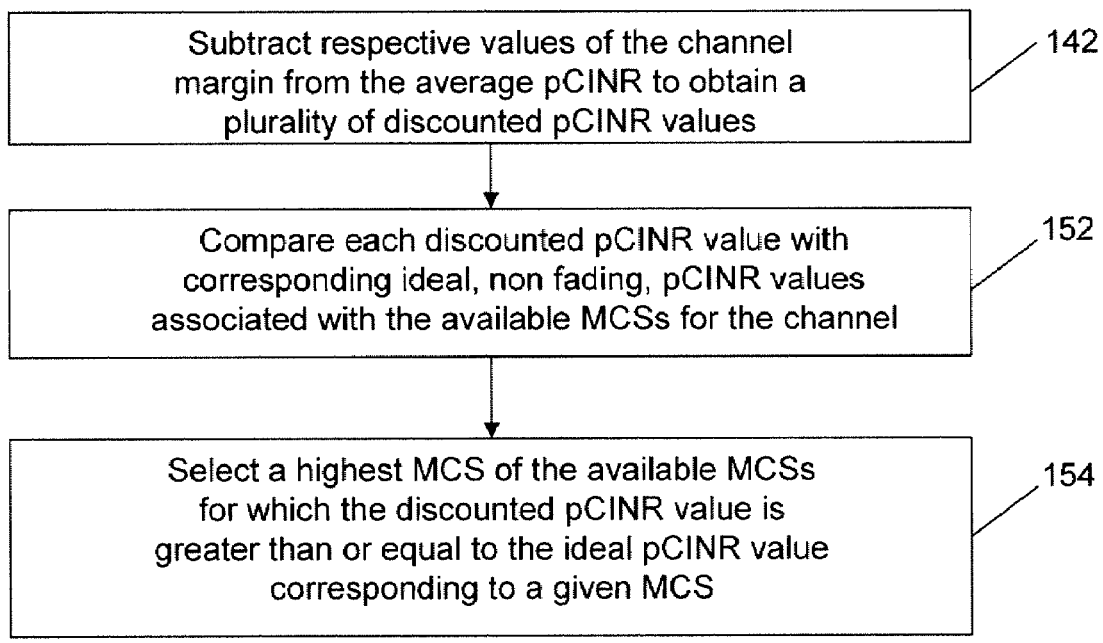

An example of the foregoing is now described with respect to FIGS. 4 and 5. FIG. 4 illustrates a flow chart that shows more specific examples of functions 140 and 150, where function 142 is a more specific example of function 140 and functions 152 and 154 are more specific examples of function 150. For the sake of simplicity, in this example there are three MCSs that are supported or available: QAM4½, QAM16½ and QAM64½. (see FIG. 5). The respective ideal non-fading pCINR for each MCSs, are {6 dB, 12 dB, 18 dB} and this data is determined or obtained from available published data in connection with a given wireless communication standard, e.g., for WiMAX, Convolutional Coding in AWGN, Table 578 of published specification for IEEE802.16e. However, it should be understood that the idea pCINR values for each available MCS may be obtained through direct experimentation in a given wireless environment and not be directly based on published values.

Assume the average pCINR is 17 dB computed from pCINR values obtained across multiple subcarriers of a received signal associated with a given mobile station user.

After channel estimation and obtaining the channel response H, the channel margin A is computed, and in this example, the set of channel margin values are: A={2 dB, 4 dB, 7 dB}.

Then, at 142 in FIG. 4, each channel margin value is subtracted from the average pCINR value, resulting in the set of discounted pCINRs {15 dB, 13 dB, 10 dB}.

At 152, each discounted pCINR value is compared with its corresponding ideal non-fading pCINR value (associated with a corresponding available MCS for the channel). In selection function 154, one finds that the highest MCS for which a discounted pCINR is greater than or equal to a corresponding ideal non-fading pCINR is QAM16½ since the discounted pCINR of 13 dB for MCS QAM16½ is greater than the ideal pCINR of 12 dB for MCS QAM16½. As a result, the eCINR in this case is 13 dB (the discounted pCINR for QAM16½). These values are indicated in FIG. 5.

The channel margin A can impact the ultimate MCS selection. An example of a technique to compute the channel margin A is now described with reference to FIGS. 6-8.

Figure 6:
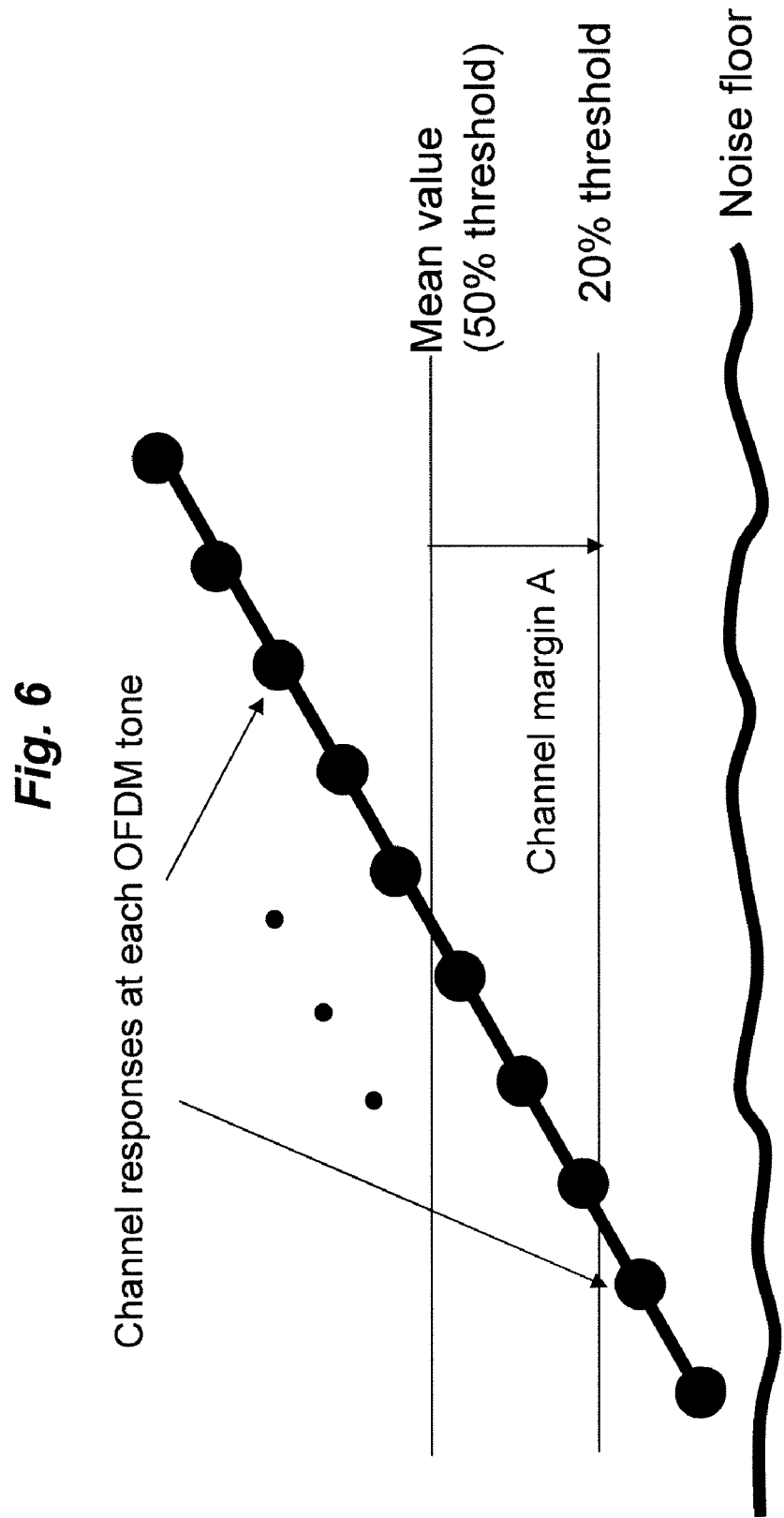
FIG. 6 depicts is a graphical diagram that depicts a process of determining channel margin in accordance with the techniques described herein.

With reference to FIG. 6, a plot of channel response estimations at multiple OFDM tones or subcarriers is shown. The delta or difference between a mean value (50%) of the channel responses and a certain percentile threshold (e.g., 20%) is computed. The difference or delta is the channel margin A, given in, e.g., dB. Different MCSs may have different percentile thresholds. The depicted 20% threshold suggests that among all of the channel responses collected on all the active tones, only 20% of those responses fall below the threshold.

Again, the channel margin A is determined by the percentile threshold. The percentile threshold is selected according to the following criteria:

The channel margin A computed with the percentile threshold preferably fairly reflects the effects of the channel on the signal quality (such that the pCINR will be fairly discounted).

The percentile threshold is preferably constant for various channel conditions. For example, for QAM4½, one should preferably use a 35% threshold for all International Telecommunication Union (ITU) channel types (Ped A, B and veh A). In other words, for a given MCS, a single threshold is preferably applicable for all the cases. This may be important as the channel condition changes from time to time, and the channel margin A should be dynamically adjusted without base station or mobile station intervention (indeed, the base station and mobile station do not have specific knowledge of the "type" of channel they are communicating across).

FIG. 7 is an example look up table (stored data) containing data that may be used to obtain a channel margin value A for selected MCSs. Specifically, FIG. 7 provides a look up table for a partial usage of subchannels (PUSC) in the WiMAX communication standard. In FIG. 7, the ideal, non-fading pCINR is indicated by "pCINR0." In a preferred embodiment, these look up tables may be encoded or stored in base station 10 (and mobile station 12) directly in controller 25 and/or in memory 27.

Although the apparatus, logic, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, logic, and method, as set forth in the following claims.

What is claimed is:

1. A method, comprising:
   determining a physical carrier-to-interference plus noise ratio associated with a wireless channel between a first wireless communication device and a second wireless communication device;
   performing channel estimation of the wireless channel to obtain a channel response for the wireless channel;
   determining a channel margin based on the channel response;
   subtracting the channel margin from the physical carrier-to-interference plus noise ratio to obtain a discounted physical carrier-to-interference plus noise ratio;
   comparing the discounted physical carrier-to-interference plus noise ratio with a corresponding ideal physical carrier-to-interference plus noise ratio for an ideal non-fading wireless channel; and
   selecting a modulation and encoding scheme to be used for wireless communication between the first wireless communication device and the second wireless communication device based on the discounted physical carrier-to-interference plus noise ratio.

2. The method of claim 1, wherein determining the physical carrier-to-interference plus noise ratio comprises computing a physical carrier-to-interference plus noise ratio value for each subcarrier among a plurality of subcarriers.

3. The method of claim 2, wherein determining the physical carrier-to-interference plus noise ratio comprises averaging physical carrier-to-interference plus noise ratio values obtained over the plurality of subcarriers.

4. The method of claim 1, wherein determining the channel margin comprises computing a set of channel margin values, each channel margin value corresponding to one of a plurality of modulation and encoding schemes available for selection.

5. The method of claim 4, wherein subtracting comprises subtracting a respective channel margin value from the physical carrier-to-interference plus noise ratio to obtain a corresponding plurality of discounted physical carrier-to-interference plus noise ratio values each associated with a corresponding modulation and encoding scheme.

6. The method of claim 5, wherein comparing comprises comparing each discounted physical carrier-to-interference plus noise ratio value with an ideal physical carrier-to-interference plus noise ratio value for a corresponding modulation and encoding scheme.

7. The method of claim 6, wherein selecting comprises selecting a highest modulation and encoding scheme among the plurality of available modulation and encoding schemes for which a discounted physical carrier-to-interference plus noise ratio value is greater than or equal to the ideal physical carrier-to-interference plus noise ratio value for a given modulation and encoding scheme.

8. The method of claim 7, wherein computing the channel margin is based on stored data for percentile thresholds determined for each of the plurality of available modulation and encoding schemes.

9. The method of claim 1, and further comprising receiving at the first wireless communication device signals transmitted from the second wireless communication device, and wherein determining the physical carrier-to-interference plus noise ratio is based on the signals received at the first wireless communication device, and wherein selecting comprises selecting a modulation and encoding scheme for use by the second wireless communication device in transmitting signals to the first wireless communication device.

10. The method of claim 1, wherein determining the physical carrier-to-interference plus noise ratio comprises receiving a transmission at the first wireless communication device from the second wireless communication device containing physical carrier-to-interference plus noise ratio measurement data made by the second wireless communication device based on transmissions received at the second wireless communication device from the first wireless communication device, and wherein selecting comprises selecting a modulation and encoding scheme that the first wireless communication device uses for transmissions to the second wireless communication device.

11. An apparatus, comprising:
a receiver configured to receive signals from another wireless communication device;
a controller coupled to the receiver, wherein the controller is configured to:
determine a physical carrier-to-interference plus noise ratio associated with a wireless channel with respect to the other wireless communication device;
perform channel estimation of the wireless channel to obtain a channel response for the wireless channel;
determine a channel margin based on the channel response;
subtract the channel margin from the physical carrier-to-interference plus noise ratio to obtain a discounted physical carrier-to-interference plus noise ratio;
compare the discounted physical carrier-to-interference plus noise ratio with a corresponding ideal physical carrier-to-interference plus noise ratio for an ideal non-fading wireless channel; and
select a modulation and encoding scheme to be used for wireless communication with respect to the other wireless communication device based on the discounted physical carrier-to-interference plus noise ratio.

12. The apparatus of claim 11, wherein the controller is configured to determine the channel margin so as to compute a set of channel margin values, each corresponding to one of a plurality of modulation and encoding schemes that are available for selection, and the controller is configured to subtract respective channel margin values from the physical carrier-to-interference plus noise ratio to obtain a plurality of discounted physical carrier-to-interference plus noise ratio values each associated with a corresponding modulation and encoding scheme.

13. The apparatus of claim 12, wherein the controller is configured to compare each discounted physical carrier-to-interference plus noise ratio value with a physical carrier-to-interference plus noise ratio value for ideal non fading channel conditions for a corresponding modulation and encoding scheme, and to select a highest modulation and encoding scheme among the plurality of available modulation and encoding schemes for which a discounted physical carrier-to-interference plus noise ratio value is greater than or equal to the ideal physical carrier-to-interference plus noise ratio value for a given modulation and encoding scheme.

14. The apparatus of claim 13, wherein the controller is configured to compute the channel margin based on stored data for percentile thresholds determined for each of the plurality of available modulation and encoding schemes.

15. The apparatus of claim 11, wherein the controller is configured to determine the physical carrier-to-interference plus noise ratio based on the signals received from the other communication device, and the controller is configured to select a modulation and encoding scheme for use by the other wireless communication device in transmitting signals.

16. The apparatus of claim 11, wherein the controller is configured to determine the physical carrier-to-interference plus noise ratio comprises from a transmission received from the other wireless communication device that contains physical carrier-to-interference plus noise ratio measurement data made by the second wireless communication device based on transmissions received at the other wireless communication device, and the controller is configured to select a modulation and encoding scheme used for transmissions to the other wireless communication device.

17. Logic encoded in one or more tangible media for execution and when executed operable to:
determine a physical carrier-to-interference plus noise ratio associated with a wireless channel with respect to the other wireless communication device;
perform channel estimation of the wireless channel to obtain a channel response for the wireless channel;
determine a channel margin based on the channel response;
subtract the channel margin from the physical carrier-to-interference plus noise ratio to obtain a discounted physical carrier-to-interference plus noise ratio;
compare the discounted physical carrier-to-interference plus noise ratio with a corresponding ideal physical carrier-to-interference plus noise ratio for an ideal non-fading wireless channel; and
select a modulation and encoding scheme to be used for wireless communication with respect to the other wireless communication device based on the discounted physical carrier-to-interference plus noise ratio.

18. The logic of claim 17, wherein the logic that determines the channel margin comprises logic that computes a set of channel margin values, each corresponding to one of a plurality of modulation and encoding schemes that are available for selection, and the controller is configured to subtract respective channel margin values from the physical carrier-to-interference plus noise ratio to obtain a plurality of discounted physical carrier-to-interference plus noise ratio values each associated with a corresponding modulation and encoding scheme.

19. The logic of claim 18, wherein the logic that compares is configured to compare each discounted physical carrier-to-interference plus noise ratio value with a physical carrier-to-interference plus noise ratio value for ideal non fading channel conditions for a corresponding modulation and encoding scheme, and the logic that selects is configured to select a highest modulation and encoding scheme among the plurality of available modulation and encoding schemes for which a discounted physical carrier-to-interference plus noise ratio value is greater than or equal to the ideal physical carrier-to-interference plus noise ratio value for a given modulation and encoding scheme.

20. The logic of claim 17, wherein the logic that computes the channel margin comprises logic that computes the channel margin based on stored data for percentile thresholds determined for each of a plurality of available modulation and encoding schemes.

* * * * *